United States Patent [19]

Sugino et al.

[11] Patent Number: 5,485,342
[45] Date of Patent: Jan. 16, 1996

[54] ABNORMAL CURRENT CUTOFF CIRCUIT

[76] Inventors: Koichi Sugino; Nobuhiro Michimoto, both of 1-1, Taihei 4-Chome, Sumida-ku, Tokyo, Japan

[21] Appl. No.: 98,643

[22] Filed: Jul. 28, 1993

[30]  Foreign Application Priority Data

Jul. 30, 1992 [JP] Japan .................................. 4-203835

[51] Int. Cl.6 ................................................... H02H 3/093
[52] U.S. Cl. ............................. 361/104; 361/93; 361/57
[58] Field of Search ................................... 361/13, 57, 93, 361/98, 101, 7, 104, 5, 6, 8, 58, 87, 94; 307/130, 131, 126

[56] References Cited

U.S. PATENT DOCUMENTS 4,704,652  11/1987  Billings ........................................ 361/5

Primary Examiner—A. D. Pellinen
Assistant Examiner—Michael J. Sherry
Attorney, Agent, or Firm—Amster, Rothstein & Ebenstein

[57] ABSTRACT

An abnormal current cut off circuit for creating a circuit break when an abnormal current flows in a circuit such as a print head driver circuit for a printer. When a driver section 3 is being driven by a power supply circuit 1, the power supply is provided to a driver circuit 2 which drives the driver section 3 via a transistor 5 which is connected in the power supply line and which is turned on by a transistor 7. When the device goes into a standby state, the transistor 5 is turned off, so that the current is supplied to the carriage motor a and the Line feed motor b within the driver section 3 via the fuse 4 and the diode 6 which are connected in parallel with the transistor 5. If an abnormal current then flows during the standby state, the fuse 4 will be broken, and transistor 7 will be turned off so that transistor 5 will also be turned off which ensures that the power supply line is cut completely.

9 Claims, 4 Drawing Sheets

ABNORMAL CURRENT CUTOFF CIRCUIT

BACKGROUND OF THE INVENTION

1. Field of the Invention

The present invention relates to an abnormal current cutoff circuit for creating a circuit break when an abnormal current flows in a circuit such as a print head driver circuit for a printer.

1. Description of the Related Art

Conventionally, when a load was being driven, abnormal currents would be detected by a current detector set up across a load. The operation of a thyristor which is connected across the poles of the power supply which receive this output is then used to blow a fuse in the power supply line.

Problems Sought to be solved by the Invention

Conventional devices however, cannot cutoff the circuit for low abnormal currents as they cannot detect abnormal currents which do not exceed the current flow present during normal operation. This means they are not sufficiently safe.

For example, when using items such as printers, a larger current is required to print solidly than a current required to print normal characters, so that the amount of current used to move the print head must be changed according to the print data for the printer. This means that if an abnormal current flows at the time of printing normal characters which does not exceed the current required to print solidly then this abnormal current cannot be detected. This can cause excess heat to be generated and in a worst case scenario can cause fire. Also, as this requires a current detector means and electrical parts such as a large current thyristor to ensure that the fuse can be blown, this approach invites cost-up.

It is, therefore, the object of this invention to provide an abnormal current circuit breaker which reliably detects abnormal currents and then cuts off the power supply, has an improved degree of safety and is of a cheaper construction.

SUMMARY OF THE INVENTION

When a load is to be driven, a power supply is connected to the load via a first switching circuit provided on a power supply line by a second switching circuit. During a standby state, the first switching circuit is then turned off so that the power supply is connected to the load via a cutoff circuit which is connected in parallel with the first switching circuit. If an abnormal current flows during standby state, the power supply line is broken by the cut off circuit, then the second switching circuit will remain off so that the first switching circuit will also turned off which ensures that the power supply line is cut completely.

Explanation of the Numerals

1. Power Supply
2. Driver circuit
3. Drive section
4. Cut off circuit
5. First switching circuit
6. Second switching circuit.

DESCRIPTION OF THE PREFERRED EMBODIMENTS

Figure 1:
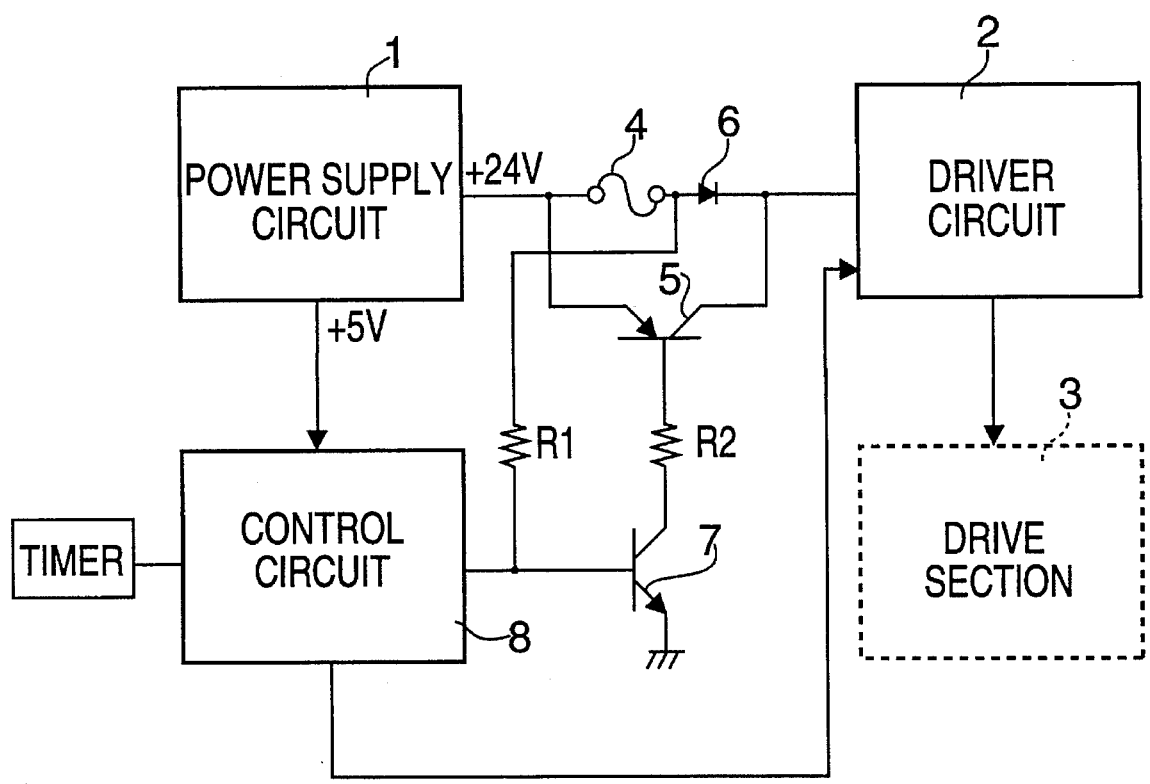
FIG. 1 is a view of an electric circuit for a first embodiment of the invention in which the cutoff circuit comprises a fuse and a diode.
Figure 2:
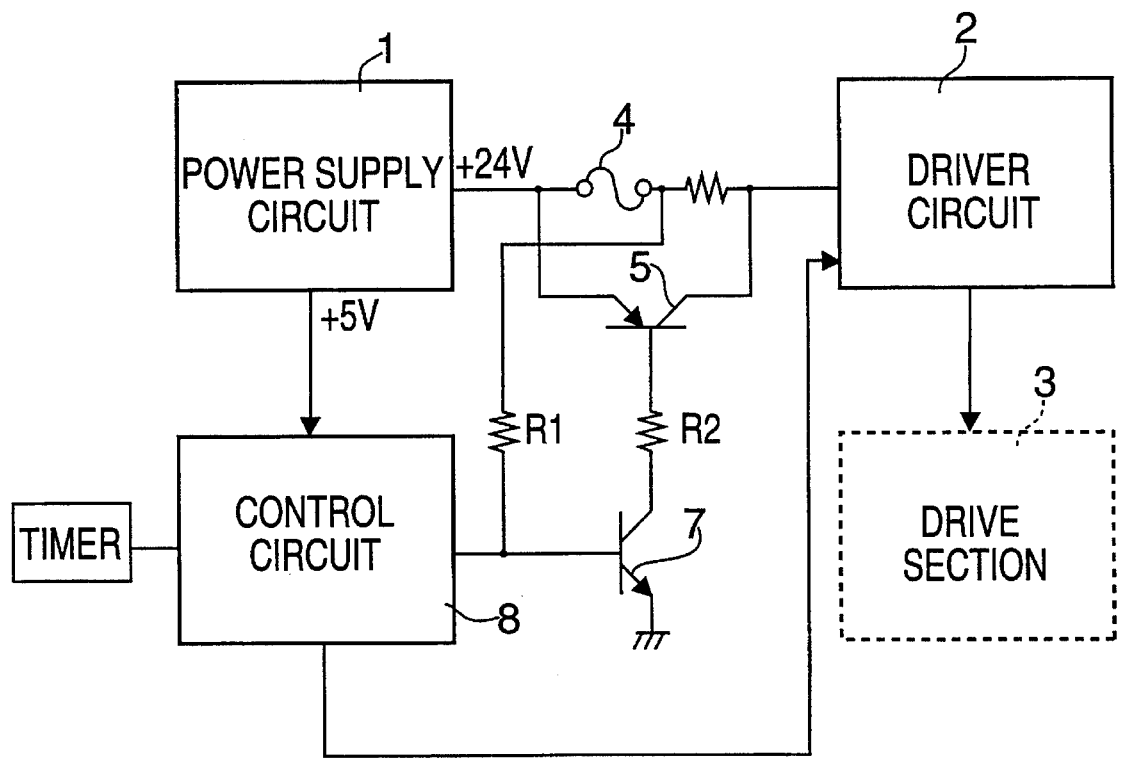
FIG. 2 is a view of an electric circuit for a second embodiment of the invention in which the cutoff circuit comprises a fuse and a resistor.
Figure 3:
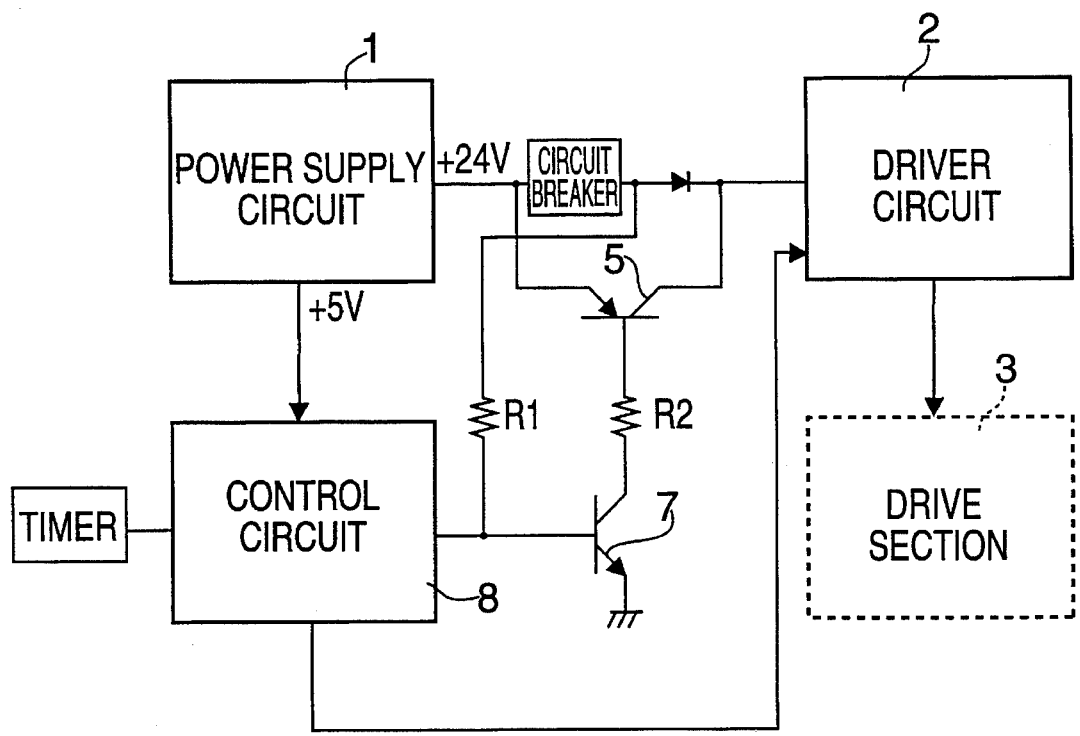
FIG. 3 is a view of an electric circuit for a third embodiment of the invention in which the cutoff circuit comprises a circuit breaker and a diode.
Figure 4:
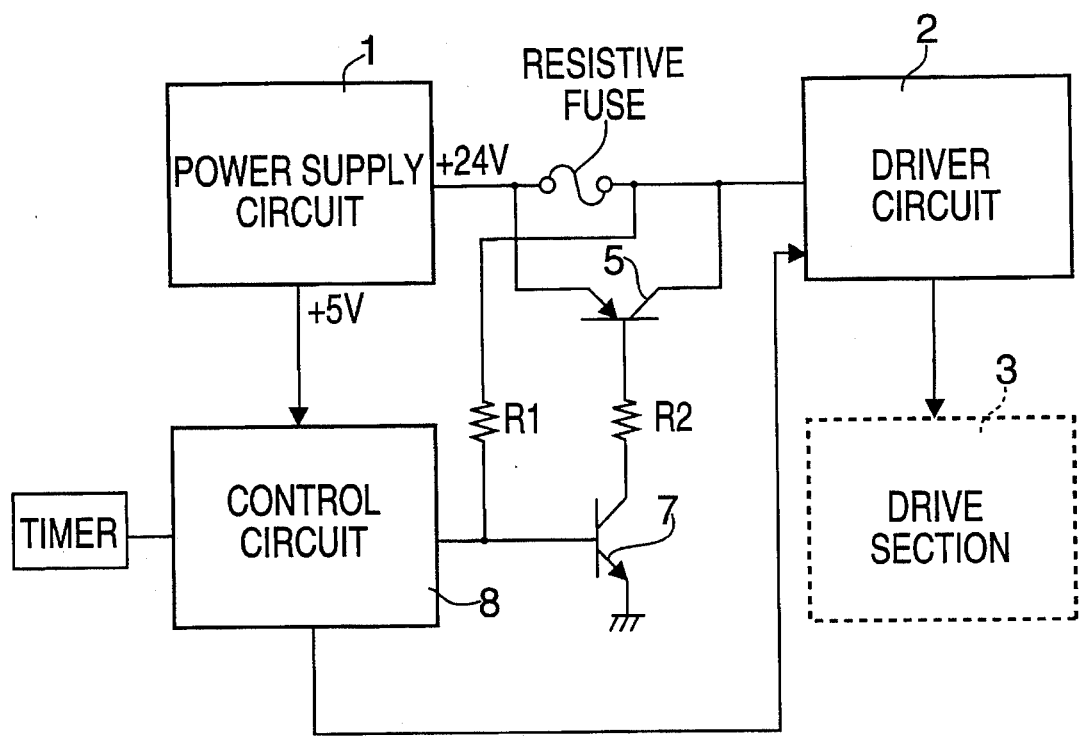
FIG. 4 is a view of an electric circuit for a fourth embodiment of the invention in which the cutoff circuit comprises a resistive fuse.

An explanation of an embodiment of this invention for use with printers will now be made with reference to the drawings. FIG. 1 is a view of the construction of a cutoff circuit for this embodiment. Here, reference numeral 1 denotes a power supply circuit for generating 24 V source voltage for a driver circuit and 5 V source voltage for electronic circuits such as CPU and numeral 2 denotes a driver circuit for driving a carriage motor a, an LF (Line Feed) motor b and a print head c which are provided within a drive section 3, with the driver circuit 2 and the drive section 3 together making up the load. The numeral 4 then represents a fuse which acts as a cutoff circuit through which the power for the driver circuit 2 is supplied during standby state. This fuse would then blow if there was a current of, for example, more than 100 mA. The numeral 5 represents a transistor which is connected in parallel with the fuse 4 to make up a first switching circuit which supplies current to the driver circuit 2 when the load is being driven. A diode 6 is then connected in series with this fuse 4 so that some of the potential required to turn this transistor 5 on will be dropped across this diode 6. The numeral 7 represents a transistor for a second switching circuit which controls switching of the transistor 5. The numeral 8 represents a control circuit constructed from electronic devices such s CPUs, RAMs and ROMs. This control circuit 8 gives an open collector type output signal to indicate a drive state and carries out the switching of the transistor 7. It also controls the driver 2 by outputting a driver control signal. R1 and R2 denote resistors.

Next, the operation will be described with reference to the same diagram.

Conventional printers usually have a drive state for printing a line from start to finish and a standby state. In the standby state, neither the carriage motor a, the LF motor b or the print head c are driven during the period of time between finishing one line and starting to print the next.

In order to enter the drive state, an open collector signal to indicate the drive state is outputted by the control circuit 8 and this signal turns transistor 7 on, which in turn turns transistor 5 on. In this way, a current up to a maximum of 3 A is supplied to the driver 2 via the transistor 5 at a voltage of 24 V. At the same time as the transistor 5 is turned on, there is a potential drop across the diode 6, but there is no potential drop across the fuse 4.

Also, when entering the standby state, transistor 7 and transistor 5 are both turned off by a signal to indicate the drive state output from the control circuit 8, and the current which was supplied to the driver 2 via the transistor 5 is stopped.

When in the standby state, a total current of 70 mA is supplied to the driver circuit 2 Via the fuse 4 and the diode 6 so that the carriage motor a and the LF motor b can be held in stop positions. Current is not supplied to the print head c at this time.

If an abnormal current occurs due to poor insulation at, for example, the print head in the standby state, there will be an increase in current through the fuse 4. As the fuse 4 is a 100 mA fuse, if an abnormal current of 30 mA is added to the normal 70 mA current that flows during the standby state this fuse 4 will blow. After this, there is no longer a power supply provided as the fuse 4 has blown. This means that current is no longer supplied via R1 and no current flows to the base of transistor 7, so even if another drive state signal is outputted, as the drive state signal is an open collector signal transistor 7 and transistor 5 will remain off. Also, the drive section 3 can no longer be driven as the 24 V power supply line which goes to the driver 2 has been cut off.

In the above way, if there is an abnormal current of 30 mA or above when the circuit is in standby state the +24 V power supply line will be cut off immediately. Conventional circuits cut off while in the normal drive mode and will have a cut off function which will cut off the power supply when there are currents in excess of 3 A. This means that the safety aspect of the present invention is much improved when compared to that of the prior art.

Also, it will usually take a period of time before an abnormal flow of current will cause fire and as the drive state will continue for only a few seconds at most, the power supply line is cut off when the standby state is entered in order to remove the risk of fire. There is, on the other hand, also a risk of fire if there is an unusually high flow of current for a short period of time. A device for cutting off such as a fuse (not shown) generally included within the power supply blow and cut off the power supply in these circumstances.

It is possible to add supplemental functions to the above construction for further improvement of the safety. For example, a "watch dog timer" (not shown) which is reset during being kept the drive state signal at a low level, could be used so that if the drive state signal being kept at a high level for a fixed period of time the circuit could be forced into the standby state by resetting the control circuit 8. In this way, if the drive state signal gets stuck at a high level for a fixed period of time because of abnormal operation of the control circuit 8, the watch dog timer can reset the control circuit 8, which will force the circuit into the standby state. This means that it is possible to cut off the power supply line even if there are abnormalities in the control circuit 8 or there are abnormal currents present.

Also, in this embodiment a diode 6 is used to create a voltage drop when the transistor 5 turns on but a resistor would also achieve the same object. It would also be possible to replace the fuse 4 and the diode 6 which make up the above cutoff circuit with a resistive fuse, or a breaker could be used in place of the fuse 4.

Further, the present invention is not merely limited to printers, and could be used to increase the safety of any electrical products which have a large number of drive sections such as video cameras.

EFFECTS OF THE INVENTION

According to the present invention, a cutoff circuit is used which reacts to very small abnormalities in the current flow when the circuit is in a standby state, so that the power supply line can be cut off even if the variations in the current are very small in relation to the currents present during the normal operation of the circuit. This means that when compared to conventional devices which only react when the current is in excess of the normal operating current, the risk of fire occurring due to continuous currents which are low in value is greatly decreased which in turn makes the device safer. The construction of the circuit is also simplified, as devices such as large current thyristors and current detectors which were necessary in conventional circuits are no longer required.

We claim:

1. An abnormal current cutoff system for cutting off current supplied from a power supply output terminal to a load input terminal comprising:

a cutoff circuit for cutting off current from said power supply output terminal to said load input terminal if an abnormal current in excess of a standby threshold flows from said power supply output terminal towards said load input terminal when said load is on standby;

a first switching circuit connected in parallel with said cutoff circuit for conducting current at a level above said standby threshold from said power supply output terminal to said load input terminal when said load is to be driven and;

a second switching circuit for controlling driving of said first switching circuit and for disabling said first switching circuit when said cutoff circuit is in cutoff.

2. An abnormal current cutoff system for cutting off current supplied from a power supply output terminal to a load input terminal comprising:

a control circuit for providing a drive signal when said load is to be in a drive condition and a standby signal when said load is to be in a standby condition;

a cutoff circuit for cutting off current from said power supply output terminal to said load input terminal if a current in excess of a standby current threshold flows from said power supply output terminal towards said load input terminal when said load is in the standby condition;

a first switching circuit connected in parallel with said cutoff circuit for conducting power from said power supply output terminal to said load input terminal when said load is in the drive condition and;

a second switching circuit for controlling driving of said first switching circuit and for disabling said first switching circuit when said cutoff circuit is open.

3. The abnormal current cutoff system of claim 2 further comprising a timer for detecting when said drive signal remains active longer than a predetermined time period and for thereby resetting said control circuit to output said standby signal.

4. The abnormal current cutoff system of claim 2 wherein said cutoff circuit comprises a cutoff switch for preventing a current in excess of the standby current threshold from being input to the load input terminal, said cutoff switch having a first terminal and a second terminal, said first terminal being closer to the power supply output terminal and said second terminal being closer to the load input terminal.

5. The abnormal current cutoff circuit of claim 2 wherein said cutoff circuit comprises a cutoff switch and a diode.

6. The abnormal current cutoff circuit of claim 2 wherein said cutoff circuit comprises a cutoff switch and a resistor.

7. The abnormal current cutoff circuit of claim 2 wherein said cutoff switch comprises a fuse.

8. The abnormal current cutoff circuit of claim 2 wherein said cutoff switch comprises a breaker.

9. The abnormal current cutoff circuit of claim 2 wherein said cutoff circuit comprises a resistive fuse.

* * * * *

UNITED STATES PATENT AND TRADEMARK OFFICE
CERTIFICATE OF CORRECTION

PATENT NO. : 5,485,342
DATED : January 16, 1996
INVENTOR(S) : Koichi Sugino; Nobuhiro Michimoto It is certified that error appears in the above-identified patent and that said Letters Patent is hereby corrected as shown below:

Item [73]

On the cover page add

--Assignee: Seikosha Co., Ltd.
Tokyo, Japan--

Signed and Sealed this

Twelfth Day of August, 1997

Attest:

BRUCE LEHMAN

Attesting Officer

Commissioner of Patents and Trademarks